United States Patent
Sharma et al.

(10) Patent No.: US 9,161,084 B1
(45) Date of Patent: Oct. 13, 2015

(54) METHOD AND SYSTEM FOR MEDIA AUDIENCE MEASUREMENT BY VIEWERSHIP EXTRAPOLATION BASED ON SITE, DISPLAY, AND CROWD CHARACTERIZATION

(71) Applicants: Rajeev Sharma, State College, PA (US);
Namsoon Jung, State College, PA (US);
Joonhwa Shin, State College, PA (US)

(72) Inventors: Rajeev Sharma, State College, PA (US);
Namsoon Jung, State College, PA (US);
Joonhwa Shin, State College, PA (US)

(73) Assignee: VideoMining Corporation, State College, PA (US)

( * ) Notice: Subject to any disclaimer, the term of this patent is extended or adjusted under 35 U.S.C. 154(b) by 224 days.

(21) Appl. No.: 13/998,392

(22) Filed: Oct. 29, 2013

(51) Int. Cl.
*H04N 7/16* (2011.01)
*H04H 60/33* (2008.01)
*H04H 60/45* (2008.01)
*H04H 60/56* (2008.01)
*H04H 60/32* (2008.01)
*H04N 21/442* (2011.01)
*H04N 21/4223* (2011.01)

(52) U.S. Cl.
CPC ..... *H04N 21/44218* (2013.01); *H04N 21/4223* (2013.01)

(58) Field of Classification Search
USPC .................................................. 725/10–12
See application file for complete search history.

(56) References Cited

U.S. PATENT DOCUMENTS

| | | | |
|---|---|---|---|
| 3,935,380 | A | 1/1976 | Coutta |
| 4,858,000 | A | 8/1989 | Lu |
| 5,331,544 | A * | 7/1994 | Lu et al. ........................ 705/7.29 |
| 5,682,465 | A | 10/1997 | Kil et al. |
| 5,771,307 | A | 6/1998 | Lu et al. |
| 5,866,887 | A | 2/1999 | Hashimoto et al. |
| 5,950,146 | A | 9/1999 | Vapnik |
| 6,437,819 | B1 | 8/2002 | Loveland |
| 6,697,104 | B1 | 2/2004 | Yakobi et al. |
| 6,879,338 | B1 | 4/2005 | Hashimoto |

(Continued)

OTHER PUBLICATIONS

U.S. Appl. No. 11/818,554, Sharma, et al.

*Primary Examiner* — Mushfikh Alam

(57) ABSTRACT

The present invention provides a comprehensive method to design an automatic media audience measurement system that can estimate the site-wide audience of a media of interest (e.g., the site-wide viewership of a target display) based on the measurements of a subset of the actual audience sampled from a limited space in the site. This invention enables (1) the placement of sensors in optimal positions for the viewership data measurement and (2) the estimation of the site-wide viewership of the target display by performing the viewership extrapolation based on the sampled viewership data. The viewership extrapolation problem is formulated in a way that the time-varying crowd dynamics around the target display is an important decisive factor as well as the sampled viewership data at a given time in yielding the estimated site-wide viewership. To solve this problem, the system elements that affect the viewership—site, display, crowd, and audience—and their relationships are first identified in terms of the visibility, the viewership relevancy, and the crowd occupancy. The optimal positions of the sensors are determined to cover the maximum area of the viewership with high probabilities. The viewership extrapolation function is then modeled and learned from the sampled viewership data, the site-wide viewership data, and the crowd dynamics measurements while removing the noise in the sampled viewership data using the viewership relevancy of the measurements to the target display.

16 Claims, 13 Drawing Sheets

(56) References Cited

U.S. PATENT DOCUMENTS

| | | | |
|---|---|---|---|
| 6,958,710 | B2 | 10/2005 | Zhang et al. |
| 6,987,885 | B2 | 1/2006 | Gonzalez-Banos et al. |
| 7,139,409 | B2 | 11/2006 | Paragios et al. |
| 7,174,029 | B2 * | 2/2007 | Agostinelli et al. .......... 382/100 |
| 7,176,834 | B2 | 2/2007 | Percy et al. |
| 7,203,338 | B2 | 4/2007 | Ramaswamy et al. |
| 8,645,985 | B2 * | 2/2014 | Deshpande et al. ............ 725/10 |
| 8,935,727 | B2 * | 1/2015 | Beppu ............................ 725/46 |
| 9,025,023 | B2 * | 5/2015 | Park et al. ..................... 348/139 |
| 2003/0068083 | A1 * | 4/2003 | Lee et al. ...................... 382/164 |
| 2004/0101212 | A1 * | 5/2004 | Fedorovskaya et al. ...... 382/305 |
| 2006/0171570 | A1 | 8/2006 | Brendley et al. |
| 2006/0179014 | A1 * | 8/2006 | Yoshida et al. ................ 706/12 |
| 2006/0200378 | A1 * | 9/2006 | Sorensen ........................ 705/10 |
| 2006/0227862 | A1 * | 10/2006 | Campbell et al. ............. 375/240 |
| 2007/0032242 | A1 | 2/2007 | Goodman |
| 2008/0004953 | A1 | 1/2008 | Ma et al. |
| 2008/0065468 | A1 * | 3/2008 | Berg et al. ........................ 705/10 |
| 2009/0037945 | A1 * | 2/2009 | Greig et al. ..................... 725/10 |
| 2009/0070798 | A1 * | 3/2009 | Lee et al. ......................... 725/10 |
| 2009/0158309 | A1 * | 6/2009 | Moon et al. ..................... 725/12 |
| 2009/0199226 | A1 * | 8/2009 | Suehiro et al. ................... 725/9 |
| 2010/0027836 | A1 * | 2/2010 | Sakurada ....................... 382/100 |
| 2010/0104256 | A1 * | 4/2010 | Tsurumi .......................... 386/69 |
| 2010/0245287 | A1 * | 9/2010 | Thorn ............................ 345/175 |
| 2010/0259539 | A1 | 10/2010 | Papanikolopoulos et al. |
| 2012/0106790 | A1 * | 5/2012 | Sultana et al. ................. 382/103 |
| 2013/0014149 | A1 * | 1/2013 | Fujii ............................... 725/14 |
| 2013/0278727 | A1 * | 10/2013 | Tamir et al. ..................... 348/47 |
| 2014/0051047 | A1 * | 2/2014 | Bender et al. ................. 434/238 |
| 2014/0063191 | A1 * | 3/2014 | Bataller et al. .................. 348/46 |
| 2014/0112553 | A1 * | 4/2014 | Yamaguchi ................... 382/118 |

* cited by examiner

METHOD AND SYSTEM FOR MEDIA AUDIENCE MEASUREMENT BY VIEWERSHIP EXTRAPOLATION BASED ON SITE, DISPLAY, AND CROWD CHARACTERIZATION

CROSS-REFERENCE TO RELATED APPLICATIONS

This patent application is a continuation in part of U.S. patent application Ser. No. 12/001,611, filed Dec. 12, 2007.

FEDERALLY SPONSORED RESEARCH

Not Applicable

SEQUENCE LISTING OR PROGRAM

Not Applicable

BACKGROUND OF THE INVENTION

1. Field of the Invention

The present invention is a system and method for designing a comprehensive media audience measurement platform that can estimate the audience of a media of interest only with the measurements of a subset of the actual audience sampled from a limited space in the site, which includes a data sampling planning and a data extrapolation method with a site, display, and crowd characterization.

2. Background of the Invention

The role of digital media for advertisement in public spaces is becoming increasingly important. The task of measuring the degree of media exposure is also deemed as very important both as a guide to the equipment installation (equipment kind, position, size, and orientation) and as a rating for the content programming. As the number of such displays is growing, measuring the viewing behavior of the audience using human intervention can be very costly.

Unlike the traditional broadcast media, the viewing typically occurs in public spaces where a very large number of unknown people can assemble to comprise an audience. It is therefore hard to take surveys of the audience using traditional interviewing through telephone or mail/email methods, and on-site interviews can be both very costly and potentially highly biased.

There are technologies to perform automated measurement of viewing behavior; the viewing behavior in this context is called 'viewership'. These automatic viewership measurement systems can be maintained with little cost once installed, and can provide a continuous stream of viewership measurement data. These systems typically employ electro-optical visual sensor devices, such as video cameras or infrared cameras, and provide consistent sampling of the viewing behavior based on visual observations. However, due to the high initial installation cost, the sensor placement planning is extremely important. While the equipment delivers consistent viewership measurements, they have limitations of measuring the view from their individual fixed positions (and orientations, in most cases). However, relocating the equipment can affect the integrity of the data.

In a typical media display scenario, it is unrealistic, if not impossible, to detect and record all instances of viewership occurring in the site using these sensors. Any optical sensor has a limited field of coverage, and its area of coverage can also depend on its position and orientation. A large venue can be covered by multiple sensors, and their individual lens focal lengths, positions, and orientations need to be determined.

The data delivered from these sensors also needs to be properly interpreted, because the viewership data that each equipment provides has been spatially sampled from the whole viewership at the site. The ultimate goal of the audience measurement system is to estimate the site-wide viewership for the display; it is crucial to extrapolate the site-wide viewership data from the sampled viewership data in a mathematically sound way.

The present invention provides a comprehensive solution to the problem of automatic media measurement, from the problem of sensor placement for effective sampling to the method of extrapolating spatially sampled data.

The prior attempts for measuring the degree of public exposure for the media, including broadcast media or publicly displayed media can be found in the following disclosures:

U.S. Pat. No. 4,858,000 of Lu, et al. (hereinafter Lu U.S. Pat. No. 4,858,000) and U.S. Pat. No. 5,771,307 of Lu, et al. (hereinafter Lu U.S. Pat. No. 5,771,307) introduce systems for measuring viewing behavior of broadcast media by identifying viewers from a predetermined set of viewers, based primarily on facial recognition. U.S. patent application Ser. No. 11/818,554 of Sharma, et al. (hereinafter Sharma) introduces a method to measure viewership of displayed objects using computer vision algorithms. The present invention also aims to measure viewing behavior of an audience using visual information, however, has focus on publicly displayed media for a general unknown audience. The present invention utilizes an automated method similar to Sharma to measure the audience viewership by processing data from visual sensors. The present invention provides not only a method of measuring viewership, but also a solution to a much broader class of problems including the data sampling plan and the data extrapolation method based on the site, display, and crowd analysis, to design an end-to-end comprehensive audience measurement system.

All of the systems presented in U.S. Pat. No. 6,958,710 of Zhang, et al. (hereinafter Zhang), and U.S. Pat. No. 7,176,834 of Percy, et al. (hereinafter Percy) involve portable hardware and a central communication/storage device for tracking audience and transmitting/storing the measured data. They rely on a predetermined number of survey participants to carry the devices so that their behavior can be measured based on the proximity of the devices to the displayed media. The present invention can measure a very large number of audience behaviors without relying on recruited participants or carry-on devices. It can accurately detect not only the proximity of the audience to the media display, but the actual measurement of the viewing time and duration based on the facial images of the audience. These prior inventions can only collect limited measurement data sampled from a small number of participants; however, the present invention provides a scheme to extrapolate the measurement data sampled from the camera views, so that the whole site-wide viewership data can be estimated.

All of the systems presented in Zhang and Percy involve portable hardware and a central communication/storage device for tracking audience and transmitting/storing the measured data. They rely on a predetermined number of survey participants to carry the devices so that their behavior can be measured based on the proximity of the devices to the displayed media. The present invention can measure a very large number of audience behaviors without relying on recruited participants or carry-on devices. It can accurately detect not only the proximity of the audience to the media display, but the actual measurement of the viewing time and duration based on the facial images of the audience. These prior inventions can only collect limited measurement data sampled from a small number of participants; however, the present invention provides a scheme to extrapolate the measurement data sampled from the camera views, so that the whole site-wide viewership data can be estimated.

There have been attempts for designing a camera platform or a placement method for the purpose of monitoring a designated area, such as U.S. Pat. No. 3,935,380 of Coutta, et al. (hereinafter Coutta), U.S. Pat. No. 6,437,819 of Loveland, et al. (hereinafter Loveland), U.S. Pat. No. 6,879,338 of Hashimoto, et al. (hereinafter Hashimoto U.S. Pat. No. 6,879,338), and U.S. Pat. Pub. No. 20100259539 of Papanikolopoulos, et al. (hereinafter Papanikolopoulos).

Coutta presented a method to place multiple cameras for monitoring a retail environment, especially the cash register area. Because the area to be monitored is highly constrained, the method doesn't need a sophisticated methodology to optimize the camera coverage as the present invention aims to provide.

Loveland presents a pan/tilt/zoom camera system for the purpose of monitoring an area and tracking people one by one, while the present invention aims to find an optimal placement of cameras so that the cameras have maximal concurrent coverage of the area and of multiple people at the same time.

Hashimoto employs multiple outward facing cameras to have a full coverage of the surroundings, while the present invention provides a methodology to place cameras to have maximal coverage given the constraints of the number of cameras and the constraints of the site, display, and the measurement algorithm.

Papanikolopoulos presents a method for placing cameras in optimal positions to maximize the observability of motion paths or activities of the crowd taking into account the obstacles in a site. Although it places cameras in optimal positions, its optimality is only for the crowd observability in the site, while the optimality of the present invention is for the observability of the viewers for a specific target display.

There have also been prior attempts for counting or monitoring people in a designated area by automated means.

U.S. Pat. No. 5,866,887 of Hashimoto, et al. (hereinafter Hashimoto U.S. Pat. No. 5,866,887) and U.S. Pat. Pub. No. 20060171570 of Brendley, et al. (hereinafter Brendley) use special sensors (distance measuring and pressure mat sensors, respectively) placed in a designated space, so that they can count the number of people passing and, in the case of Brendley, classify the kind of traffic, whereas in the present invention the visual sensor based technology can measure not only the amount of traffic, but also the direction of the traffic, and on wider areas.

U.S. Pat. Pub. No. 20070032242 of Goodman, et al. (hereinafter Goodman) introduces using the tracking of active wireless devices, such as mobile phones or PDAs, so that the people carrying these devices can be detected and tracked. The crowd estimation method of the present invention can measure the crowd traffic without any requirement of the people carrying certain devices, and without introducing potential bias toward business people or bias against seniors or children.

U.S. Pat. No. 6,987,885 of Gonzalez-Banos, et al. (hereinafter Gonzalez-Banos), U.S. Pat. No. 6,697,104 of Yakobi, et al. (hereinafter Yakobi), and U.S. Pat. No. 7,203,338 of Ramaswamy, et al. (hereinafter Ramaswamy) detect and count the number of people in a scene by processing video frames to detect people. One of the exemplary embodiments of the present invention utilizes top-down view cameras so that person detection and tracking can be carried out effectively, where an individual person in the crowd is being tracked so that both the crowd density and direction can be estimated. These prior inventions do not concern the crowd directions.

U.S. Pat. No. 7,139,409 of Paragios, et al. (hereinafter Paragios) measures the pattern of crowd motion without explicitly detecting or tracking people. One of the exemplary embodiments of the present invention also makes use of such crowd dynamics estimation, however, it is a part of the comprehensive system where the goal is to extrapolate the sampled viewership measurement based on the crowd dynamics.

U.S. Pat. Pub. No. 20080004953 of Ma, et al. (hereinafter Ma) characterizes the audience of public display or advertising system using sensors and builds an audience distribution model. The audience distribution model is utilized to deliver contents to matched audience. Although it analyzes and characterizes the audience of the target display, it is not able to estimate the site-wide audience since it only measures the audience only within the sensing range of the sensors employed. The present invention, however, estimates the site-wide viewership of a target display by the viewership extrapolation.

There have been prior attempts for learning a general mapping based on available training data, such as U.S. Pat. No. 5,682,465 of Kil, et al. (hereinafter Kil) and U.S. Pat. No. 5,950,146 of Vapnik, et al. (hereinafter Vapnik).

The present invention makes use of a statistical learning method similar to Kil or Vapnik, where the input-output relation between a large number of data can be used to learn a regression function. In the present invention, the regression function is used to compute the viewership extrapolation mapping.

In summary, the present invention aims to measure the media viewership using automated and unobtrusive means that employ computer vision algorithms, which is a significant departure from methods using devices that need to be carried by a potential audience. It also provides comprehensive solutions to the sensor placement issue and data extrapolation issue, based on the site and display analysis; these features also contrast with the inventions just introducing measurement algorithms. There have been prior inventions that address the problem of sensor placement for the purpose of monitoring people's behavior, but the present invention provides an optimal solution to the issue based on the analysis of the site and the display. The present invention employs statistical machine learning approaches, similarly to some of the prior inventions, to extrapolate the sampled viewership data to estimate the site-wide viewership data; the method of the present invention utilizes the learning approach to achieve time-dependent extrapolation of the viewership data based on the insights from the crowd and viewership analysis.

SUMMARY

Measuring how many and how long their contents are successfully delivered through a particular display is critical for the marketers and advertisers to assess the effectiveness of the displays and the contents. In many practical situations, however, it is not possible to measure the entire viewership of a certain display due to various reasons including the availability of adequate sensors, the hardware limitation of the available sensors, and the budgetary issues.

The present invention provides a comprehensive method to design an automatic media audience measurement system that can estimate the site-wide audience of a media of interest (e.g., the site-wide viewership of a target display) based on the measurements of a subset of the actual audience sampled from a limited space in the site. This invention enables (1) the placement of sensors in optimal positions for the viewership data measurement and (2) the estimation of the site-wide viewership of the target display by performing the viewership extrapolation based on the sampled viewership data. The viewership extrapolation problem is formulated in a way that the time-varying crowd dynamics around the target display is an important decisive factor as well as the sampled viewership data at a given time in yielding the estimated site-wide viewership. To solve this problem, the system elements that affect the viewership—site, display, crowd, and audience—and their relationships are first identified in terms of the visibility, the viewership relevancy, and the crowd occupancy.

To place the sensors in optimal positions, the system first estimates how likely a viewer is located at a certain position in the site and the viewer is engaged with a particular display, which will be referred to as the viewership distribution. The sensors are placed in the site in such a way that the sensors cover the area where the most viewing is expected to occur and where the largest number of potential viewers can be captured. However, the placement of sensors needs to be carried out within the constraints imposed in each site and user in terms of the hardware specification of available sensors and budgets. The viewership distribution is estimated based on two basic analysis on the relationship between the target display and other potential displays that may attract the attention of the crowd (which will be referred to as the site-display analysis) and the relationship between the displays and the crowd in the given site (which will be referred to as the site-crowd dynamics analysis).

Given the sensors optimally placed in the site for viewership measurement, the viewership extrapolation function is then modeled and learned from the sampled viewership data, the site-wide viewership data, and the crowd dynamics measurements in the viewership extrapolation learning module. A viewership of a display is defined as a feature set that may include the head-count, the dwell time, the attention time, and the demographic information such as gender and age of viewers of the display. The extrapolation function may be modeled as a parametric or non-parametric function and learned based on the sampled viewership data and the crowd dynamics measurements using a variety of machine learning algorithms for parametric or non-parametric estimation. The learning process of the extrapolation function may be carried out separately for different time periods such as morning, afternoon, and evening in a day or every one hour depending on the resolution. This separate learning process results in a database of the extrapolation functions associated with different time periods. The underlying reasoning is that the whole relationship among the three major parameters (i.e., the sampled and site-wide viewership data and the crowd dynamics) may depend on the time periods in a day. An important step in the viewership extrapolation is that the sampled viewership data undergoes a processing of eliminating the false-positives in the measurements and thereby estimate the true sampled viewership data. This processing is critical in estimating the site-wide viewership data since it essentially removes the noise introduced when measuring the viewership data. The crowd dynamics is captured in a form of a feature that contains the population and motion of the crowd in the site. The crowd dynamics feature may be represented as a concatenated histogram of the orientation of the optical flows as an exemplary embodiment.

In the testing stage when the system is deployed in a real site, the sampled viewership data obtained only from the sensing region of the sensors around the target display is refined to estimate the true sampled viewership data. Next it is fed into the learned extrapolation function with the crowd dynamics measurements. Then the site-wide viewership data is finally estimated.

DRAWINGS

Figures

Figure 13:
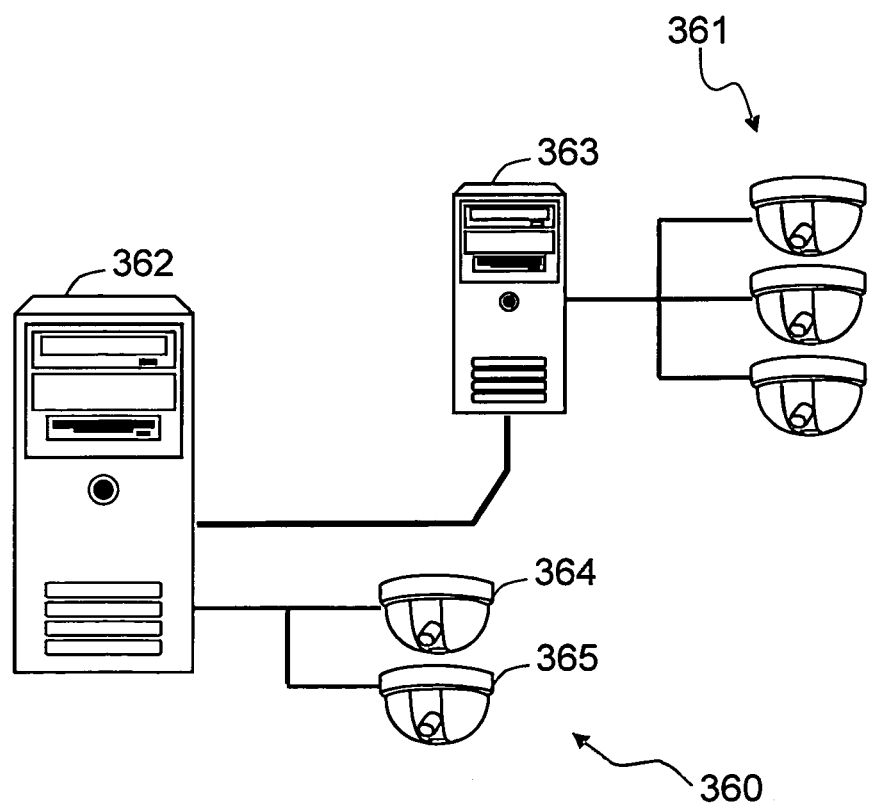

FIG. 13 shows an exemplary networked system of a plurality of means for control and processing and a plurality of sensors in the present invention that is used to build a comprehensive media audience system, where the networked system further consists of a plurality of first means for control and processing and a plurality of second means for control and processing, each of which takes a part of the vision processing of images captured by the sensors for the viewers of displays in a site.

DETAILED DESCRIPTION OF THE INVENTION

Figure 1:
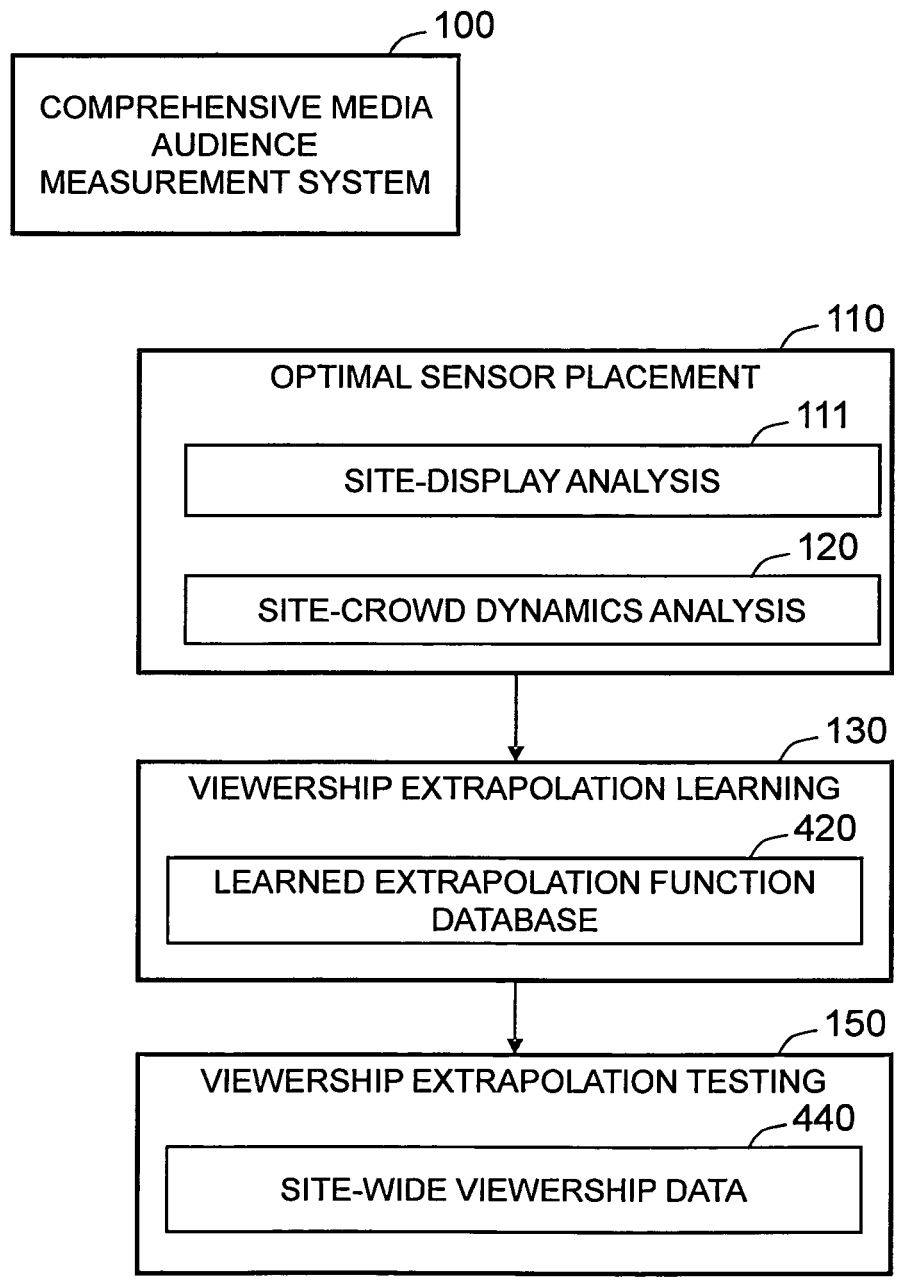
FIG. 1 is an overview of the comprehensive media audience measurement system invented, which consists of three major steps: (1) optimal sensor placement, (2) viewership extrapolation learning, and (3) viewership extrapolation testing.

FIG. 1 is an overview of the comprehensive media audience measurement system 100, which consists of three major steps: (1) optimal sensor placement 110, (2) viewership extrapolation learning 130, and (3) viewership extrapolation testing 150. The goal of this invention is that given a set of sensors (i.e., the means of capturing images) placed in the site that may not be able to observe the entire media audience of the target display, we want to estimate the entire media audience of the target display by extrapolating the media audience partially sampled only within the sensing ranges of the sensors. We will refer to the media audience of a particular display as the viewership of the display in a form of a feature set, which may include head-count, dwell time, attention time, and demographic information such as gender and age of viewers of the display. To accomplish the goal of estimating the site-wide viewership, we first introduce a method that can optimally place sensors in the site so that the accuracy of the media audience extrapolation would be maximized. The optimal sensor placement 110 is carried out based on the viewership distribution of a target display over the site, which is estimated based on two fundamental analysis: the site-display analysis 111 (refer to the detailed description regarding FIG. 3) and the site-crowd dynamics analysis 120 (refer to the detailed description regarding FIG. 6). In these two analyses, the system elements that affect the viewership—site, display, crowd, and audience—and their relationships are identified in terms of the visibility, the viewership relevancy, and the crowd occupancy.

Given the optimally placed sensors, a set of viewership extrapolation functions are learned in the viewership extrapolation learning 130 stage based on the measurements of (1) the sampled viewership data and (2) the crowd dynamics, with (3) the site-wide viewership ground-truth data. The reason behind measuring the crowd dynamics for the viewership extrapolation is because the mapping function between the sampled viewership and the site-wide viewership relies on the time-varying crowd dynamics. We will explain more detail in FIG. 8 on how the crowd dynamics affects the viewership extrapolation. The learned extrapolation function database 420 is then used in the viewership extrapolation testing 150 stage to actually estimate the site-wide viewership data 440 in real deployment by extrapolating the sampled viewership data and the measured crowd dynamics.

Figure 2:
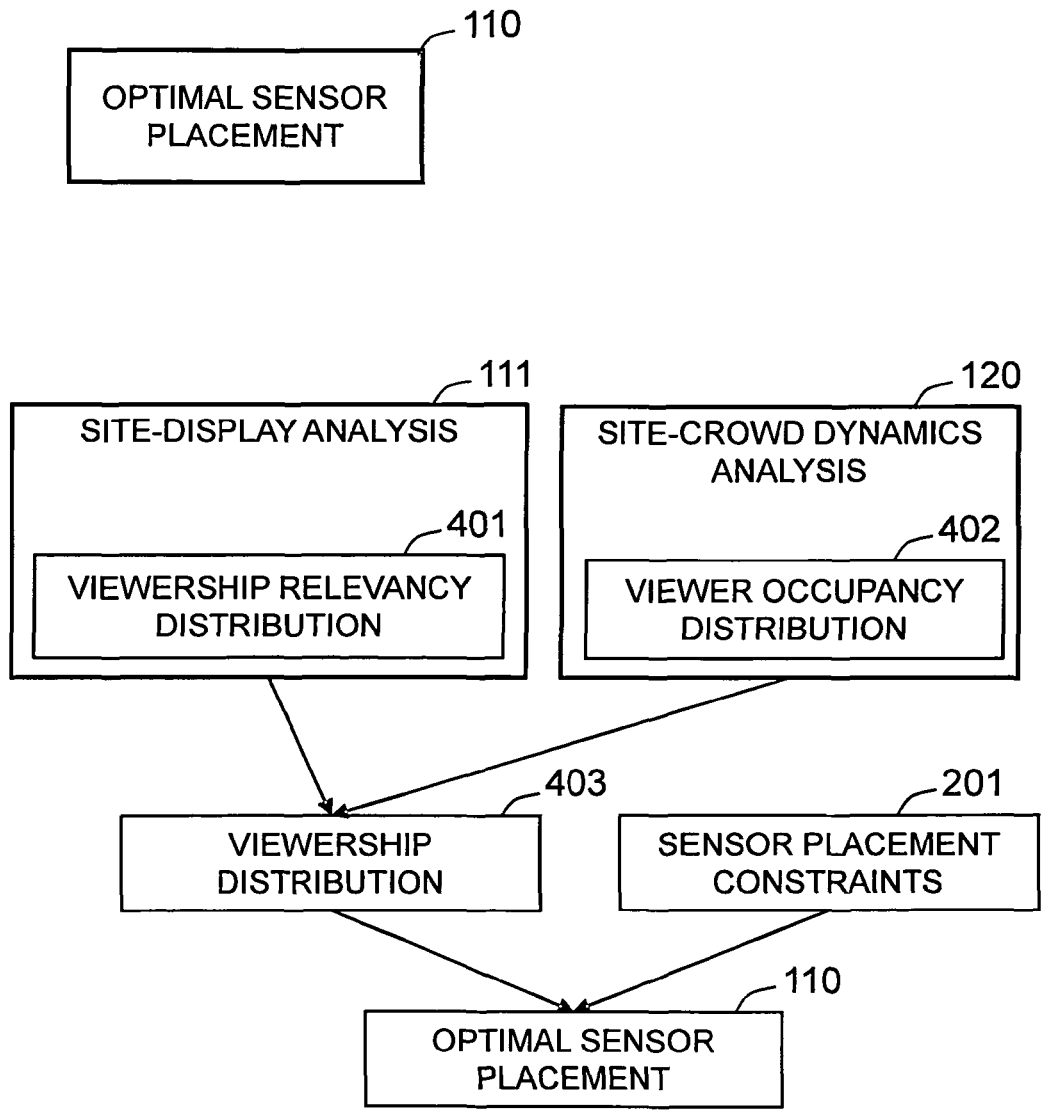
FIG. 2 shows the steps to accomplish the optimal sensor placement in the given site.

FIG. 2 shows the steps to accomplish the optimal sensor placement 110 in the given site. The sensors need to be placed in such a way that they can capture the maximum number of viewership of the target display with the highest accuracy, given the sensor placement constraints 201. Before going into the detail, we first define a viewer as a random variable X that represents a personal in the crowd who is actively engaged in a display in the site by receiving the contents delivered through the display. Let us further define the viewership distribution 403 for the display $w_i$ as the probability distribution that a viewer is located at a certain position x in the site and the viewer is engaged with the display $w_i$. Then, the viewership distribution 403 can be described by a probabilistic form as $p_x(x, w_i)$. The optimal positions of the sensors are determined in such a way that the sum of the viewership distribution 403 within the sensing range is a maximum, given the sensor placement constraints 201. The sensor placement constraints 201 may include the total budget, the hardware specifications of available sensors such as the viewing angle and the resolution, and the environmental factors such as the limited spaces where the sensors can be physically located. The viewership distribution 403 can be decomposed and estimated separately by using the following probability formula: $p_x(x, w_i) = p_x(w_i|x) p_x(x)$. We will refer to the probability distribution $p_x(w_i|x)$ as the viewership relevancy distribution 401 that represents the probability that a viewer is engaged with the display $w_i$, given a viewer at a position x. The viewership relevancy distribution 401 can be estimated through the site-display analysis 111. The site-display analysis 111 analyzes the relationships among the displays in the site in terms of how likely a viewer located at a given position is attracted by a particular display in the presence of other displays in the site. It will be explained in detail in FIG. 3. We again refer to the probability distribution $p_x(x)$ as the viewer occupancy distribution 402 that represents how likely a viewer for any display is located at a position x in the site. The viewer occupancy distribution 402 is estimated by the site-crowd dynamics analysis 120 which will be explained in more detail in FIG. 6. There could be multiple factors that can affect the pattern that the viewers are located in a given site. The pattern of the traffic flow of the crowd in terms of the direction and the velocity in the site would certainly be one of factors that shape the occupancy of the viewers at a given time.

Figure 3:
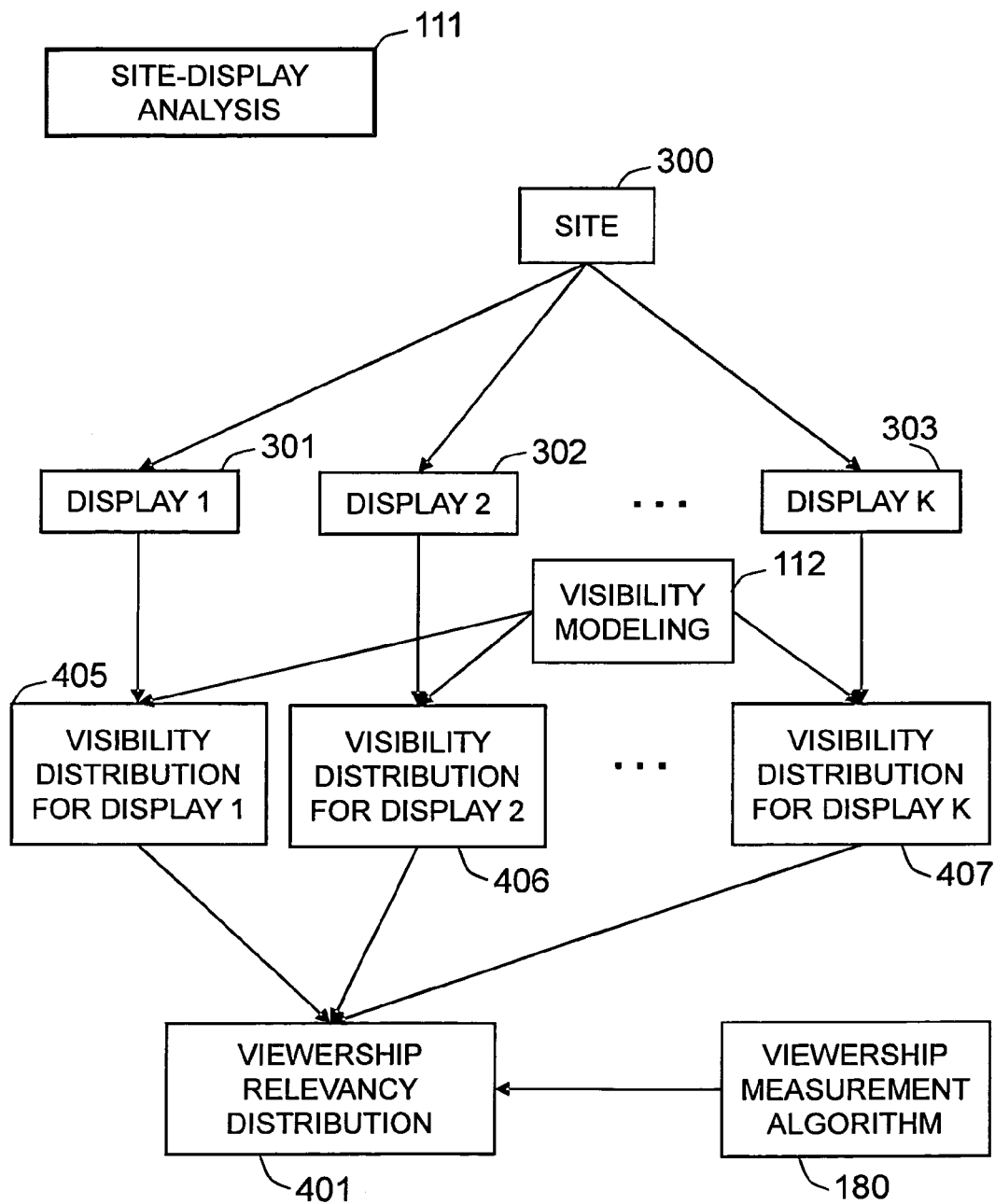
FIG. 3 shows the site-display analysis that produces the viewership relevancy distribution for a display in the site.

FIG. 3 shows the site-display analysis 111 that produces the viewership relevancy distribution 401 for a display in the site 300. For a given site, all the visual elements that can potentially attract and draw attention of a subset of the crowd are identified and labeled as display 1 301, display 2 302, and display K 303 if there are K such elements in the site 300. A set of attributes and parameters of the displays are also identified, which include the screen parameters (such as brightness, contrast, the degree of dynamic change of the contents) and the geometric and geographic information of the displays (such as size and position relative to the site 300, the visibility of the displays to the crowd varies in different locations). For the visibility modeling 112 of the displays, an area of interest where a viewer can be located on the floor for a particular display may be identified. The area may be modeled as a viewing frustum that is bounded by a near and a far plane with four side planes determined by the viewing angle of the display. A region of interest on the floor is identified where the crowd may occupy to view the display. This region can be found by projecting the viewing frustum of the target display onto the floor. While the viewing frustum defines a space where there is at least a reasonable amount of the visibility, the degree of the visibility may vary within the viewing frustum. Thus, a certain form of probability distribution may be employed to model this visibility such as a uniform and a Gaussian probability distribution. A uniform distribution may be employed over the region on the floor defined by the viewing frustum if we assume that the degree of visibility of a display is uniform across all the positions in the region of interest. A Gaussian distribution may be instead employed if we assume that there is a hot spot of the degree of visibility within the region of interest. Let us define the visibility of a display as the probability that a viewer of a given display $w_i$ is expected to be located at a certain position x, which is denoted as $p_x(x|w_i)$. Let us define $P(w_i)$ as the probability that the display $w_i$ is selected, which can be thought of as a prior knowledge given the site. We may assume that the prior probability $P(w_i)$ is equal to all the displays or is proportional to the size of the displays. Then the viewership relevancy distribution 401 for a display can be estimated by using a Bayes' rule:

$$p_x(w_i | x) = \frac{p_x(x | w_i) P(w_i)}{\sum_{j=1}^{K} p_X(x | w_j) P(w_j)}. \quad (1)$$

The viewership relevancy indicates how likely a viewer is actually viewing a particular display at a given position in the presence of distractions from other displays. This plays a critical role in the overall viewership extrapolation since the true site-wide viewership needs to be estimated from the true sampled viewership data, which can be obtained by correcting the sampled viewership data with this viewership relevancy distribution 401. This process will be explained in more detail in FIG. 9.

Note that the viewership relevancy depends on what algorithm is used to sample the viewership. If the viewership measurement algorithm 180 employed is able to localize the viewers for a particular display yet with no specific information on the orientation of the viewers, then the viewership relevancy can be estimated only based on the visibility distribution of displays (e.g., the visibility distribution for display 1 405, the visibility distribution for display 2 406, ..., the visibility distribution for display K 407 if there are K displays in the site 300). But, if the viewership measurement algorithm 180 is able to identify the orientation of a viewer to some extent as well as its position, then the viewership relevancy estimation needs to take into account how accurately the measurement algorithm can detect the orientation of the viewer. In case of 100% accuracy in estimating the orientation of the viewer, for example, the viewership relevancy will always be 1.0, since there will be no false-positive detection of viewers of the target display. In another exemplary embodiment, however, the accuracy of the viewership measurement algorithm varies depending on the relative angle between the orientation of a viewer and the sensor. Suppose the viewership measurement algorithm 180 is a simple face detection algorithm specifically trained to detect only the frontal face images. Then, the accuracy of detecting frontal face images would be high around 95% yet its detection rate decreases to 80% in case the angular deviation exceeds 10 degree, and it goes to 50% in case of 30 degree of angular deviation, for example. Then the viewership relevancy needs to be estimated taking this into consideration. In an exemplary embodiment, the degree of visibility of other displays may be adjusted according to the detection rate in such a way that the visibility of other displays is reduced proportionally according to the angular deviation of the displays and the target display from the viewer's point of view.

Figure 4:
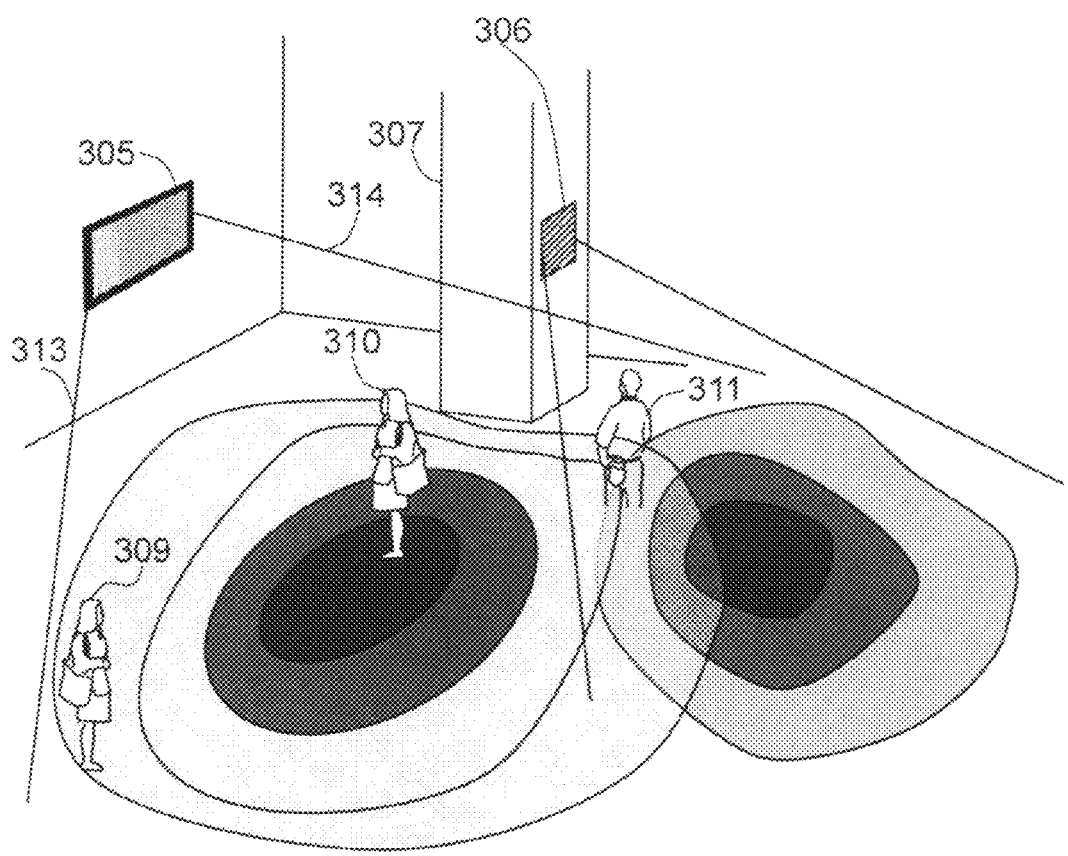
FIG. 4 shows an illustrated exemplary visibility distribution for each display in the site.

FIG. 4 shows an illustrated exemplary visibility distribution for each display in the site. In this figure, we assume that there are two displays: one against a wall (which will be denoted as the display A 305) and the other is on the pillar 307 (which will be denoted as the display B 306). The viewing frustum of the display A 305 is briefly described by the bounding line A 313 and the bounding line B 314 that bounds the viewing frustum in the horizontal axis. Similarly the viewing frustum of the display B 306 is also briefly described. The visibility of each display is modelled as a Gaussian probability distribution in this example that has a peak around the center of the viewing frustum of each display. Some of the equiprobability contours of the Gaussian are shown in the figure with different intensity levels: the darker the region is, the higher the visibility is. An equiprobability contour for a Gaussian is supposed to be an ellipsoid by definition, but as we can see in the figure, some of the equiprobability contours have dents and irregular shapes. These were intentional since it is possible that the visibility of a display may incorporate the physical aspects of the site such as walls and pillars that may block and affect the visibility. Such physical constraints can be represented as different forms of probability distributions or limiting hard boundaries that may result in truncation of the visibility distribution.

Since the visibility is estimated for each display, there could be certain regions where multiple displays are visible at the same time, one of which is in this example the region that the viewer F 311 is located (We will denote the three viewers in the figure from the left-most as the viewer D 309, the viewer E 310, and the viewer F 311). The viewer F 311 may be detected as a viewer of the display B yet with a certain degree of uncertainty depending on the viewership measurement algorithm employed. However, there is a possibility that the viewer F 311 is actually looking at the display A 305 instead. Thus, it needs to be estimated how likely a viewer is actually engaged with a particular display in the presence of potential attractions nearby. As mentioned earlier, this is defined as the viewership relevancy distribution for a display and will be discussed in more detail in FIG. 5 with an example.

Figure 5:
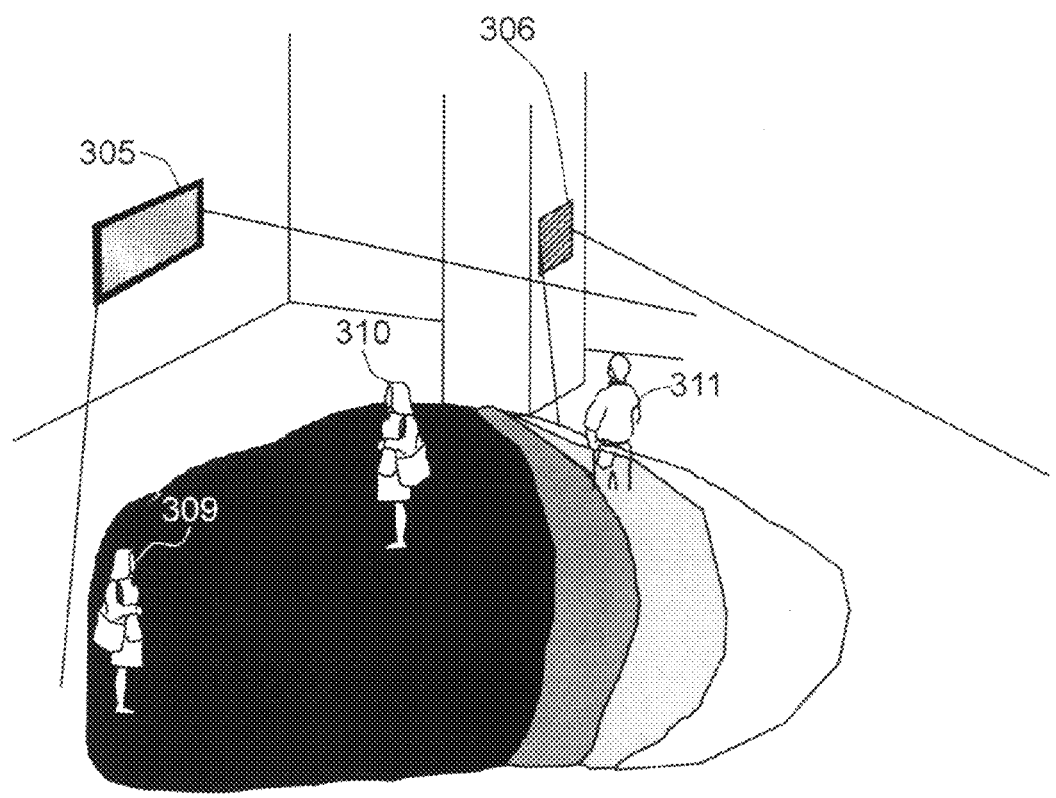
FIG. 5 shows an illustration of an exemplary viewership relevancy distribution for a target display that incorporates the visibility distribution of all other displays.

FIG. 5 shows an illustration of an exemplary viewership relevancy distribution for a target display (which will be the display A 305 in this example) that incorporates the visibility distribution of all other displays. In this example, we will describe how the visibility and the viewership relevancy are related to each other by comparing the three positions in the site where three viewers are located in the figure same as in FIG. 4: the viewer D 309, the viewer E 310, and the viewer F 311. Recalling the equation (1), at the position of the viewer D 309, the visibility of the display A 305 is low as shown in FIG. 4, but the visibility of the display B 306 is extremely low, which is close to zero. Thus, the visibility of the visibility of the display A 305 is relatively much higher than that of the display B. Since the denominator of the viewership relevancy probability at a point is merely the sum of these two probabilities, the viewership relevancy at the position of the viewer D 309 will be high. At the position of the viewer E 310, the visibility of the display B 306 gets a bit larger than when at the position of the viewer D 309 under a Gaussian modeling. But the visibility of the display A 305 is also peaked around the center of the viewing frustum, which is close to the location of the viewer E 310. Thus, the visibility of the display A 305 would again be relatively much higher at the position of the viewer E 310 than that of the display B 306, resulting in a high viewership relevancy of the display A 305. However, the visibility of the display A 305 decreases at the position of the viewer F 311 while the visibility of the display B 306 becomes higher than that at the position of the viewer E 310. Therefore, the viewership relevancy of the display A 305 starts becoming lower gradually as the relative visibility of the display B 306 becomes higher. Note that the viewership relevancy distribution only depends on the relative degree of visibility rather than the absolute degree of visibility as its name implies.

Figure 6:
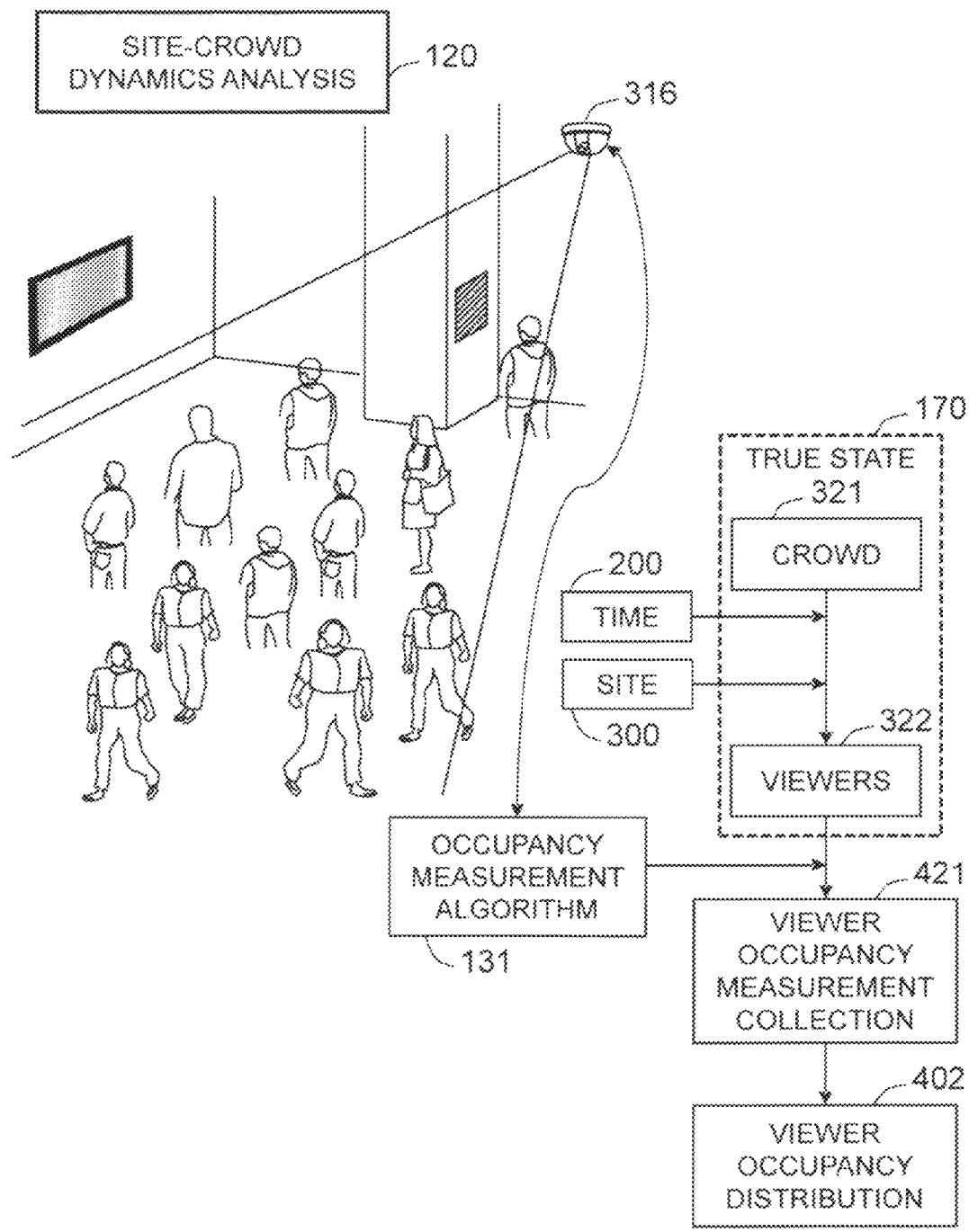
FIG. 6 shows the site-crowd dynamics analysis with an illustration that describes how the crowd becomes the viewer in the site and how the viewer occupancy distribution is estimated by means of capturing images.

FIG. 6 shows the site-crowd dynamics analysis 120 with an illustration that describes how the crowd 321 becomes the viewers 322 in the site 300 and how the viewer occupancy distribution 402 is estimated by means of capturing images 316. Before going into detail, we note that we add an assumption here for the site-crowd dynamics analysis 120; the assumption is that at least a means of capturing images 316 such as a ceiling-mounted surveillance camera is installed in the target site in such a way that at least brief snapshots of how the viewers 322 are distributed over the site 300 can be captured and extracted by either a human operator or a computer program based on the captured images. Multiple images of the viewers 322 in the site 300 may be captured across a period of time (which constructs a viewer occupancy measurement collection 421), and the occupancy of the viewers 322 who are engaged with any display over the site 300 can be estimated. As long as the means of capturing images (i.e., sensor) 316 can grasp the distribution of the viewers in the site 300, its specific location would not be an important factor. The sensor 316 may be attached under the ceiling as shown in the figure or may be attached around the display facing toward the viewers. Since the site-crowd dynamics analysis 120 is a pre-processing of the final optimal sensor placement, it could be possible that one may initially place a sensor 316 in a place around the display to analyze the crowd dynamics in the site 300, and then later adjust the location of the sensor in an optimal position once the site-crowd dynamics analysis 120 and other steps are completed. Of course, it is always possible to deploy separate and/or multiple sensors in different locations as long as it does not conflict with the sensor placement constraints.

At a given time 200 and site 300 when the displays that may attract the attention of the crowd 321 are identified, some of the crowd 321 may become the viewers 322. Yet, who are actually the viewers 322 is still in the true state 170, which has not been measured yet. The viewers 322 are then discovered by the system using an occupancy measurement algorithm 131 to the images captured by the sensor 316 deployed. The collected viewer occupancy measurements are analyzed to estimate the viewer occupancy distribution 402 by, for example, averaging the occupancy of viewers in the site over a period of time. The viewer occupancy distribution 402 shows how the viewers in the site are distributed when they are engaged with any display.

Note that in case of extremely scarce resources, the viewer occupancy distribution 402 may be assumed based on the overall visibility distribution in the site without actually deploying a sensor and measuring the crowd dynamics. Such assumption can be made with an underlying reasoning that the viewers 322 will likely be located in the positions where it is more comfortable and easier to watch the displays due to better visibility.

Figure 7:
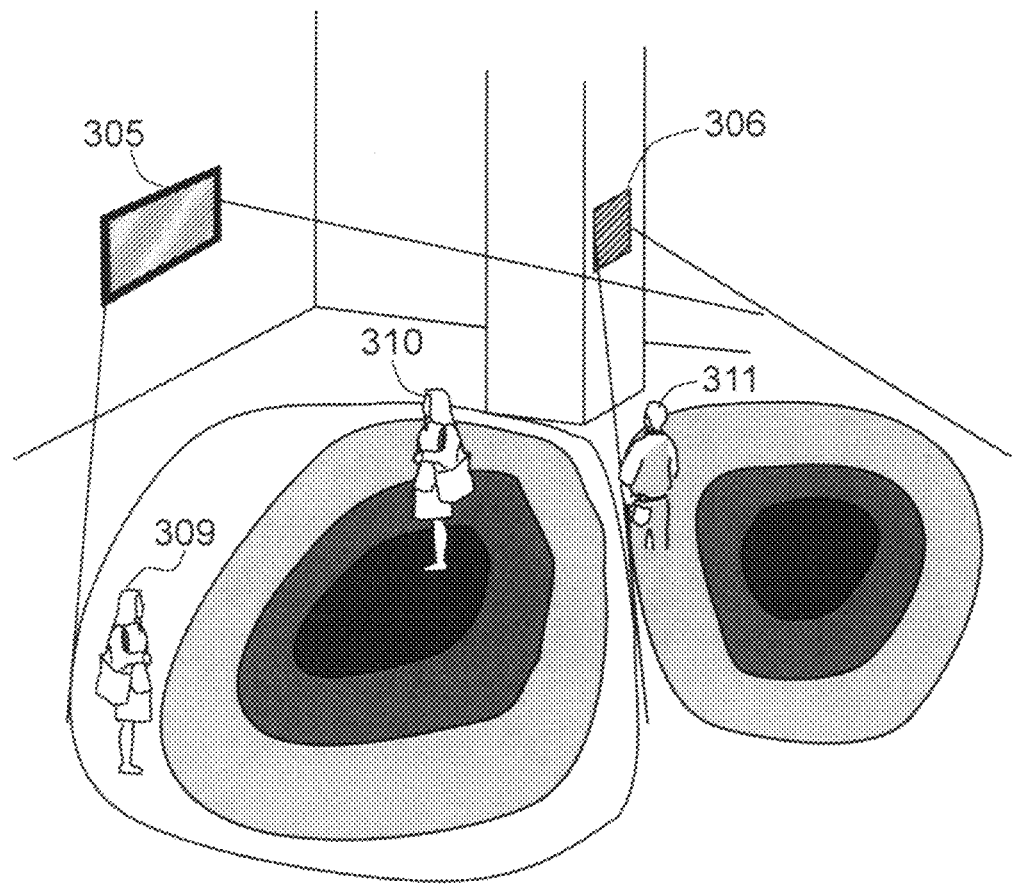
FIG. 7 shows an illustration of an exemplary viewership distribution for each display in the site, which represents how likely a viewer for a particular display is located at a certain position in the site.

FIG. 7 shows an illustration of an exemplary viewership distribution for each display in the site, which represents how likely a viewer for a particular display is located at a certain position in the site. As discussed in FIG. 2, the viewership distribution is computed based on two fundamental analysis: the site-display analysis and the site-crowd dynamics analysis. In the site-display analysis, we modeled and estimated the visibility distribution $p_x(x|w_i)$ which is dependent only on a particular display while the viewership relevancy distribution $p_x(w_i|x)$ tells the relative viewership of a given viewer at a certain position for a particular display. The viewer occupancy distribution $p_x(x)$ was how likely a viewer of any display is located at a given site. Putting this all together, it is discussed that we can estimate the viewership distribution, which is denoted as $p_x(x,w_i)=p_x(w_i|x)p_x(x)$. More detail on the viewership distribution will be discussed here with three different positions in the site again. At the position of the viewer D 309, the viewership probability is likely to be low since although the viewership relevance is high, the viewer occupancy probability may be low since it is far from the center of the viewing frustum of the display A 305 and the viewers are not likely to be located there unless the area is crowded. At the position of the viewer E 310, the viewer occupancy probability is expected to be high while the viewership relevancy is also high. Thus, the resulting viewership probability will be high as well. At the position of the viewer F 311, the viewer occupancy probability may not be significantly different from that at the position of the viewer E 310 since both the viewers of the display A 305 and the viewers of the display B 306 may be located at the same time. However, the viewership relevancy probability of the display A 305 drops dramatically around the position of the viewer F 311 due to the overlapped visibility. Thus, the overall viewership distribution for the display A 305 is also expected to be decreasing significantly around the position of the viewer F 311. On the other hand, the viewership distribution 403 of the display B 306 is increasing rapidly in turn because of the similar reason. The optimal sensor placement in FIG. 2 is carried out based on this viewership distribution in such a way that the sum of the viewership probabilities that fall into the sensing range of the sensors is maximized given the constraints of sensor placement such as the budget and limited space of physical locations where the sensors can be mounted as mentioned earlier.

Figure 8:
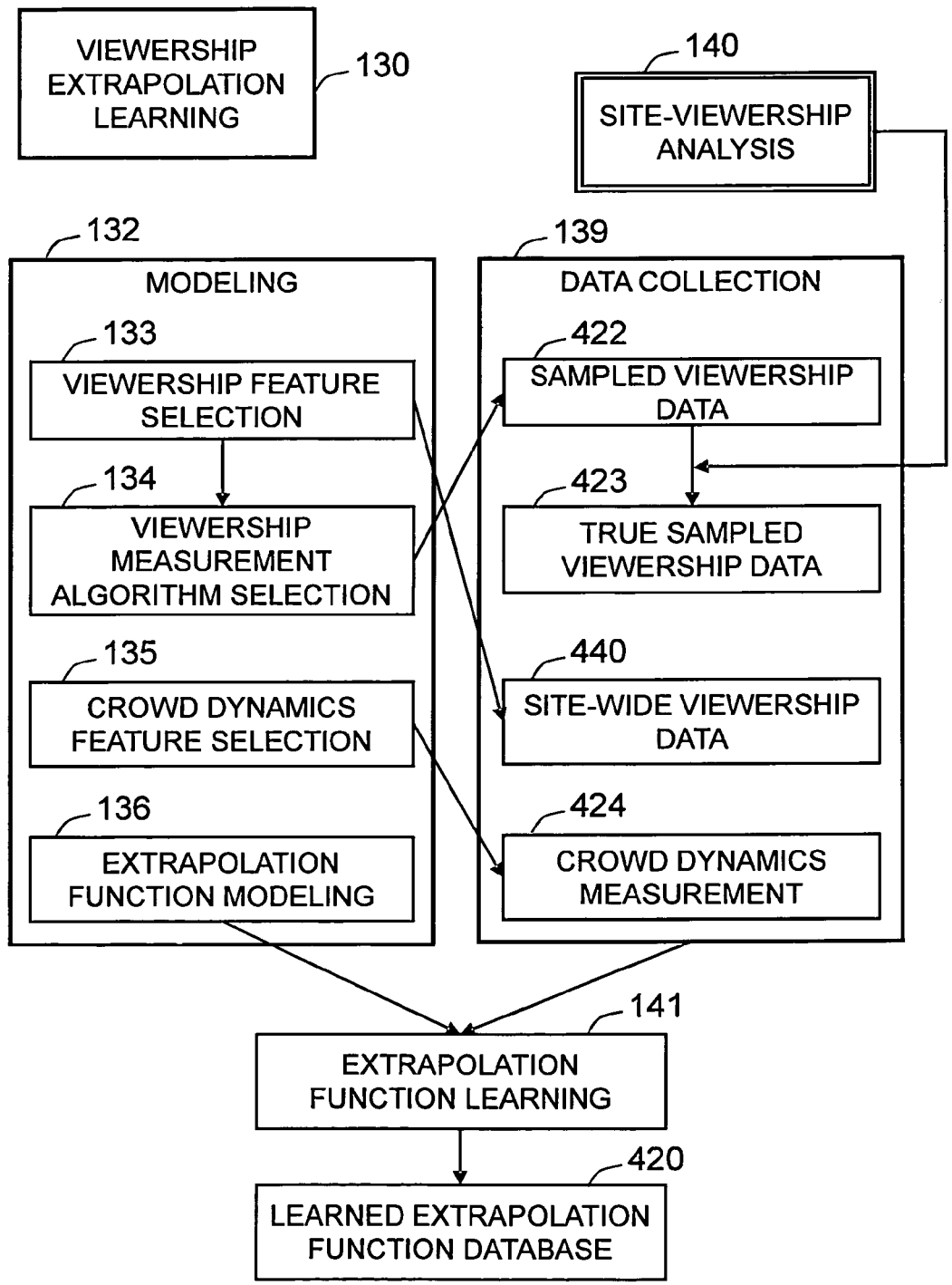
FIG. 8 shows the overall structure of the modules that constitute the viewership extrapolation learning stage including modeling, data collection, and learning modules.

FIG. 8 shows the overall structure of the modules that constitute the viewership extrapolation learning 130 module including modeling 132, data collection 139, and learning modules. In the modeling 132 stage, we perform viewership feature selection 133, crowd dynamics feature selection 135, and extrapolation function modeling 136. In the viewership feature selection 133 module, we define what attributes of viewers we want to capture such as the viewer count, dwell time, attention time, and demographic information such as gender and age. Given the attributes of viewers to be measured, then the viewership measurement algorithm selection 134 needs to be performed. The viewership measurement algorithm would be able to detect and track the viewers for a particular display with a reasonable accuracy, but does not need to be 100% accurate since we are going to refine the results using the viewership relevancy distribution later, which will be discussed in more detail in FIG. 9. Such refinement process is carried out by the site-viewership analysis 140 to the sampled viewership data 422 to estimate the true sampled viewership data 423. As discussed earlier, the reason behind performing the site-viewership analysis is because the sampled viewership data 422 may contain the false-positives to some extent depending on the viewership relevancy and the viewership measurement algorithm. By estimating the true sampled viewership data 423, the site-wide viewership data that will be obtained through the viewership extrapolation in the testing stage will have a higher accuracy. The site-wide viewership data 440 in this learning stage is obtained through a human operator or a computer algorithm based on multiple images taken on the site in a period of time as discussed earlier.

Given the site-wide viewership data 440 and the sampled viewership data 422 which is measured only within the sensing area of a sensor, basically we want to learn a mapping function between these two elements so as to estimate the site-wide viewership data 440 when only the sampled viewership data 422 is available, which is called the viewership extrapolation. However, as we discussed earlier, we identify that the crowd dynamics in the site when the viewership data is captured plays a critical role in the relationship between the two viewership data. Thus, we also measure the crowd dynamics in this stage, and it is predicated by the modeling of the crowd dynamics feature. The crowd dynamics feature selection 135 module defines how the crowd dynamics can be captured in a form of a feature that may contain the amount of traffic and its velocity in a given time period. More detail in how the crowd dynamics features can be measured will be discussed in more detail in FIG. 11 with an illustrative example.

Given both the sampled and the site-wide viewership data and the crowd dynamics measurement 424, we model the viewership extrapolation at a given time t as the following form:

$$s(t)=f(r(q(t)),c(t)), \qquad (2)$$

where s(t) is the site-wide viewership data 440, c(t) the crowd dynamics measurement 424, q(t) the sampled viewership data 422, r(q(t)) the true sampled viewership data 423, and $f(\bullet)$ the mapping function (i.e., the extrapolation function). Since the inputs and outputs are known, the extrapolation function $f(\bullet)$ can be learned based on the inputs and outputs, given an appropriate modeling of the function. The model of the extrapolation function $f(\cdot)$ is given by the extrapolation function modeling 136 as either parametric or non-parametric function.

A simple parametric function that could be employed as an exemplary embodiment is a linear regression function between the sampled and site-wide viewership data for each cluster of the crowd dynamics features. Let us suppose there is a set of the crowd dynamics measurements 424 associated with a set of pairs of the sampled and site-wide viewership data. In case the crowd dynamics feature is in a high-dimensional space, a dimensionality reduction technique can be applied such as the principal component analysis (PCA). The crowd dynamics features are then clustered in the feature space using an appropriate clustering algorithm such as k-means clustering. Then, the extrapolation function may be modeled as the following:

$$s(t)=a_i r(q(t))+b_i, \text{ for } c_i(t), \quad (3)$$

where i is the index of the crowd dynamics feature cluster, and $a_i$ and $b_i$ are parameters. The parameters $a_i$ and $b_i$ can be estimated by using a least-square or maximum-likelihood type of estimators based on the database of the pairs of the sampled and site-wide viewership data associated with the same crowd dynamics feature cluster $c_i(t)$. Such process constitutes the extrapolation function learning 141 module. The resulting tuples of ($a_i$, $b_i$, $c_i(t)$) will be stored in a database as the learned extrapolation function database 420. The learning process of the extrapolation function may be carried out separately for different time periods such as morning, afternoon, and evening. It is because the whole relationship among the three major parameters (i.e., the sampled and site-wide viewership data and the crowd dynamics) may depend on the time periods in a day.

It is also possible that we instead model the extrapolation function as just a scaling function with a single parameter a(t), and store all the tuples of (a(t), c(t) without performing any clustering.

Figure 9:
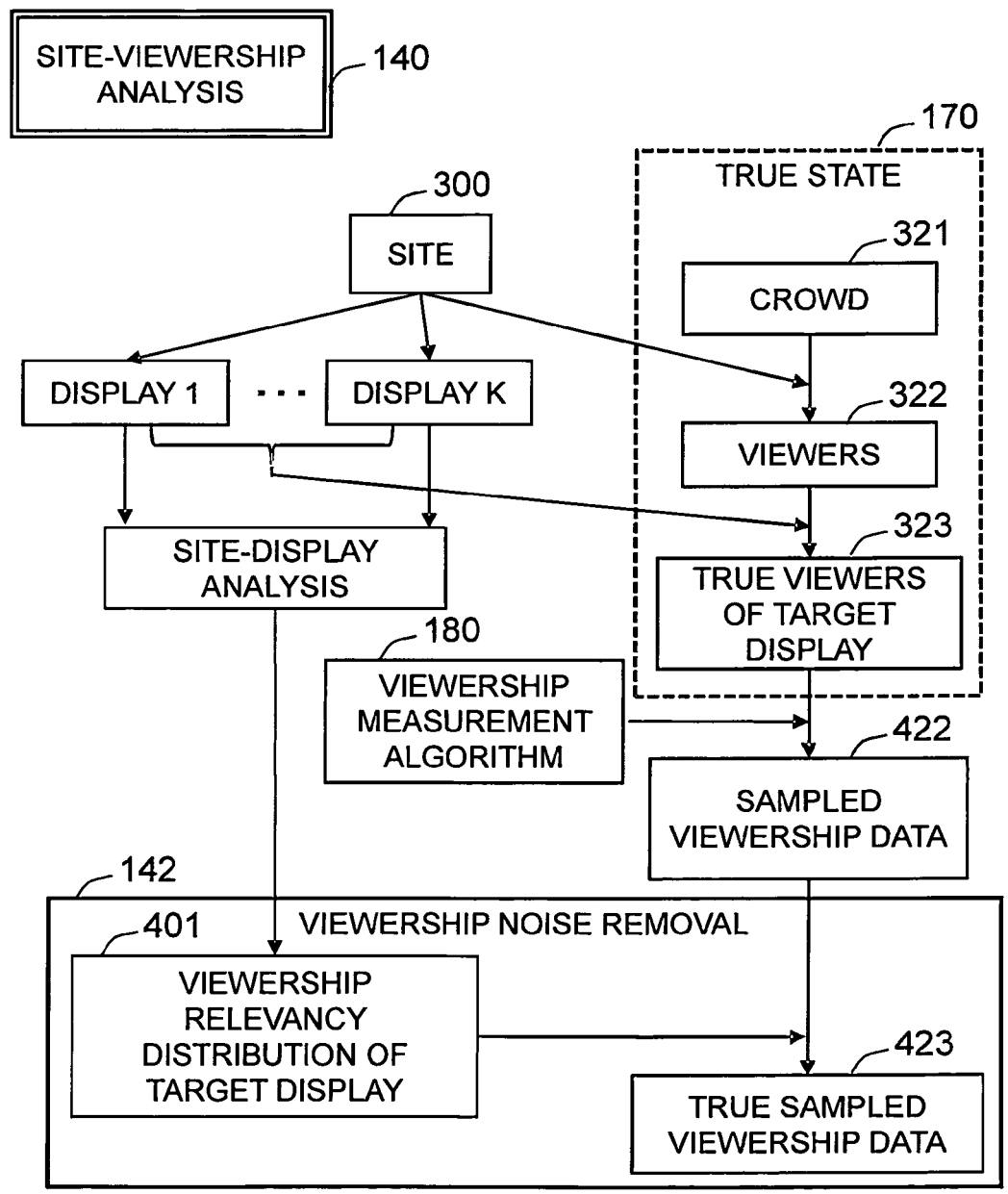
FIG. 9 shows how the site-viewership analysis is carried out, which is used to estimate the true viewership data from the measured data by removing the viewership noise.

FIG. 9 shows how the site-viewership analysis 140 is carried out, which is used to estimate the true sampled viewership data 423 from the sampled viewership data 422 obtained from a sensor by removing the viewership noise. When a site 300 is specified with its all of its visual elements (i.e., displays) that may draw attention of the crowd 321, some of the crowd 321 become the viewers 322 in the site. There must be a partition of this viewers at a given time since a viewer can be engaged with only one display at a time. Given a target display, only a subset of the viewers 322 in the site 300 are the true viewers of the target display 323 among the other displays. The true viewers are in a true state 170 since it is not observed yet. To identify the true viewers of the target display 323, a viewership measurement algorithm 180 is employed to obtain a sampled viewership data 422 from the sensing range of the sensor. However, due to the possible false-positives in the measurements, we need a process to remove the noise in the measurements, which is denoted as the viewership noise removal 142. The viewership noise removal 142 can be performed using the viewership relevancy distribution of the target display 401. An exemplary embodiment of this process would be the following: Suppose the viewership measurement algorithm 180 detects a viewer at a position p. Suppose again that the viewership relevancy probability at the position p is 0.3, for example. Then the system accepts the detected viewer as a true viewer with the probability of 0.3. Thus, whenever a viewer is newly detected, for example, the system runs a random number generator with a uniform distribution between 0 and 1. If the random number is less than 0.3, then it accepts it as a true viewer. Otherwise, the detected viewer will be considered as a false-positive and will be counted as a crowd. By applying this approach, the noise in the sampled viewership data introduced when obtaining measurements can be reduced.

Figure 10:
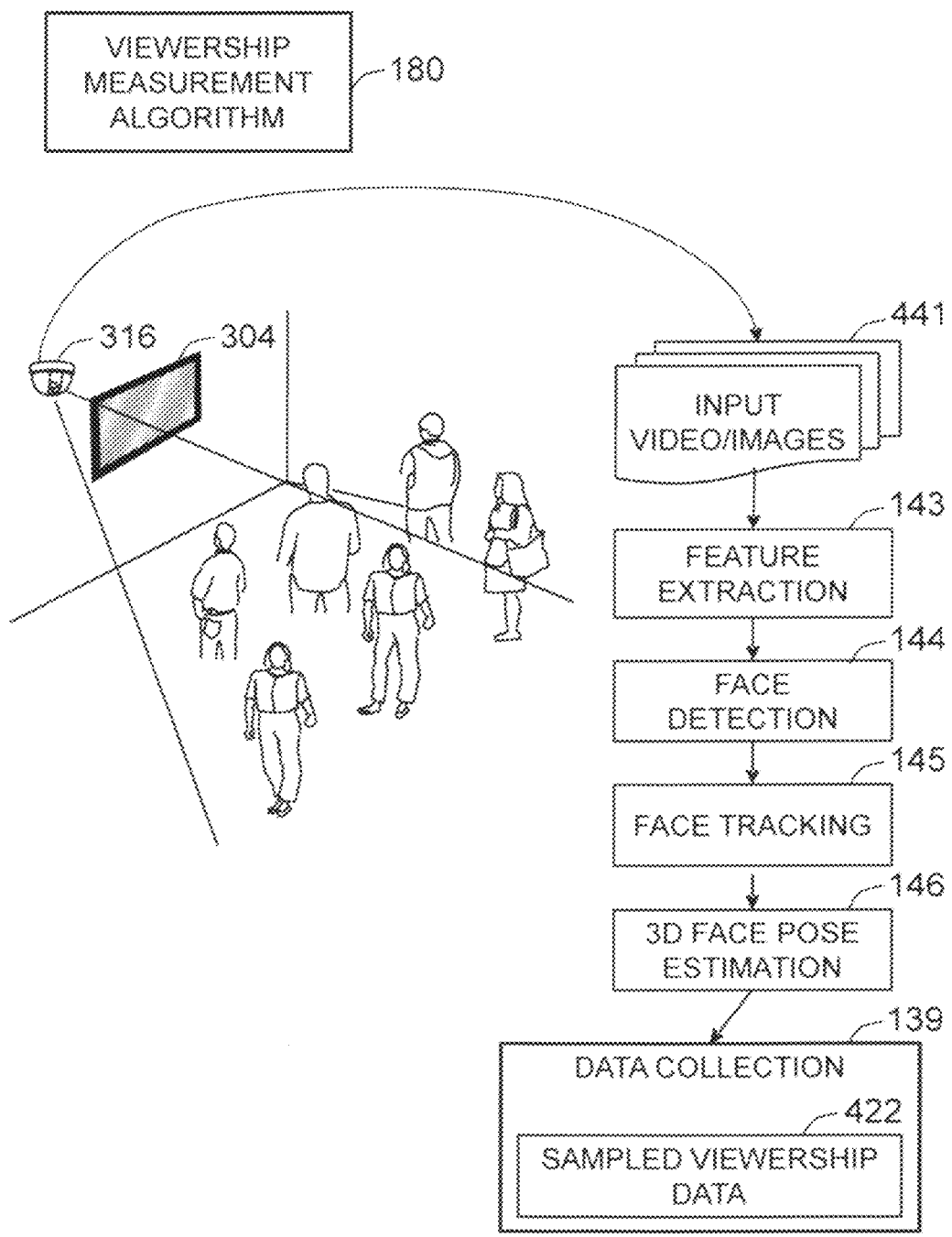
FIG. 10 shows an exemplary embodiment of the key components of the viewership measurement algorithm with their steps.

FIG. 10 shows the key components of the viewership measurement algorithm 180 with their steps. In this embodiment, the viewership measurement algorithm 180 may consist of several computer vision modules that perform a variety of image and vision processing, ranging from the low-level image enhancement up to the high-level inference such as tracking and recognition. Given a sensor 316 that can capture a video or images of the viewers of the target display 304, a series of computer vision modules is applied to the input video/images 441 constantly captured from the sensor 316. In an exemplary embodiment where face is used as a major feature to detect a viewer, the vision processing pipeline would include feature extraction 143, face detection 144, face tracking 145, and 3D face pose estimation 146 modules. Depending on the face detection and tracking algorithm, the features that can be used for detecting face would include color-based histograms to detect skin tones, Haar-like features as used in Viola-Jones framework, local features such as the templates of eyes, lips, and noses, and combined features. The algorithms for face detection 144 may be based on, for example, either cascade classifiers such as the Viola-Jones face detection algorithm, linear discriminant analysis, principle component analysis, or iterative closest point. The algorithms for face tracking 145 may be based on either Kalman filter, Particle filter, or 3D active appearance/shape model-based approaches. The algorithms for 3D face pose estimation 146 may utilize the landmarks extracted from the detected faces to estimate the 3D pose of the faces by comparing the relative locations among the face landmarks. The series of computer vision algorithms would first detect the faces of the potential viewers and prune out the viewers based on the viewing frustum of the display. The final results of the data collection 139 on the viewership would constitute the sampled viewership data 422.

In another exemplary embodiment where the shape and motion of the viewers are used to detect a viewer, for example, the histogram of oriented gradient (HoG) feature may be utilized as a feature to detect the viewers as well as their spatial and temporal motion information. Thus, if a person is detected by using HoG features and the person is standing in the site for longer than a threshold, then the person may be considered as a viewer in the site.

Figure 11:
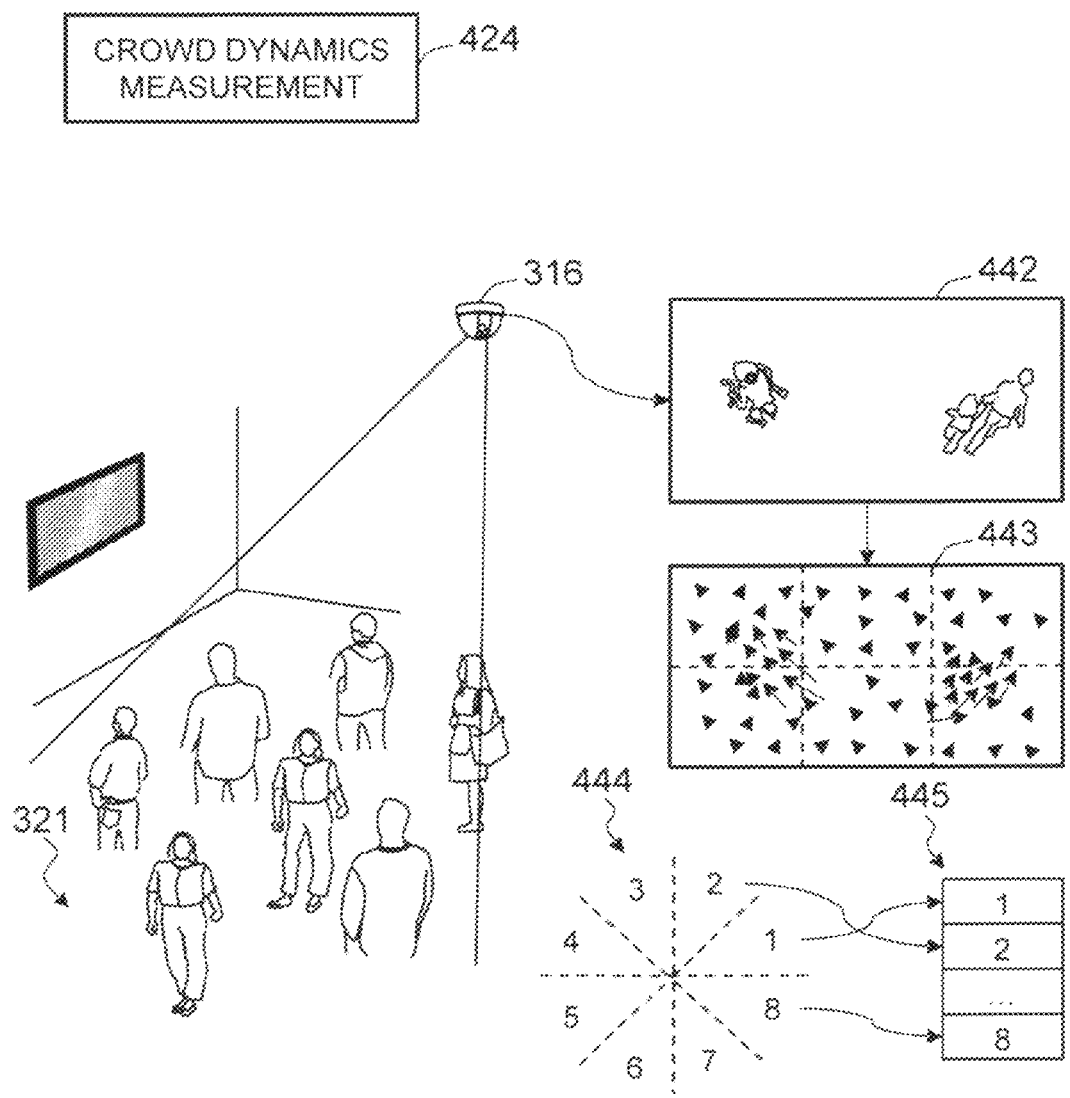
FIG. 11 illustrates an exemplary embodiment of how the crowd dynamics is captured by a means of capturing images (i.e., a sensor) in the extrapolation function learning stage and how it is represented as a feature vector.

FIG. 11 illustrates an exemplary embodiment of how the crowd dynamics is captured by a means of capturing images (i.e., a sensor) in the extrapolation function learning stage and how it is represented as a feature vector. Given a sensor 316 that can oversee at least a part of the crowd in the site, the images of the crowd 321 are captured consecutively. Once an image 442 of the crowd is taken by the sensor 316, the image 442 undergoes a processing for feature extraction. Various types of features may be employed to represent the dynamics of the crowd 321. An exemplary embodiment of the crowd dynamics feature may be based on the optical flows 443 of the image 442. After the optical flow 443 of the image 442 is computed by comparing with the image previously taken, the optical flows 443 may be gathered separately according to the area it belongs in a grid within the image. The optical flows 443 in each area of the grid may be further clustered into multiple bins in a histogram 445 according to its orientation 444. An embodiment of the histogram 445 is shown in the figure, which has eight bins. The histogram of the orientation of the optical flows for the areas in the grid may be concatenated to represent the crowd dynamics in the entire image as a single feature. The magnitude of the histogram and the normalized histogram may be used to represent the crowd dynamics measurements 424.

Figure 12:
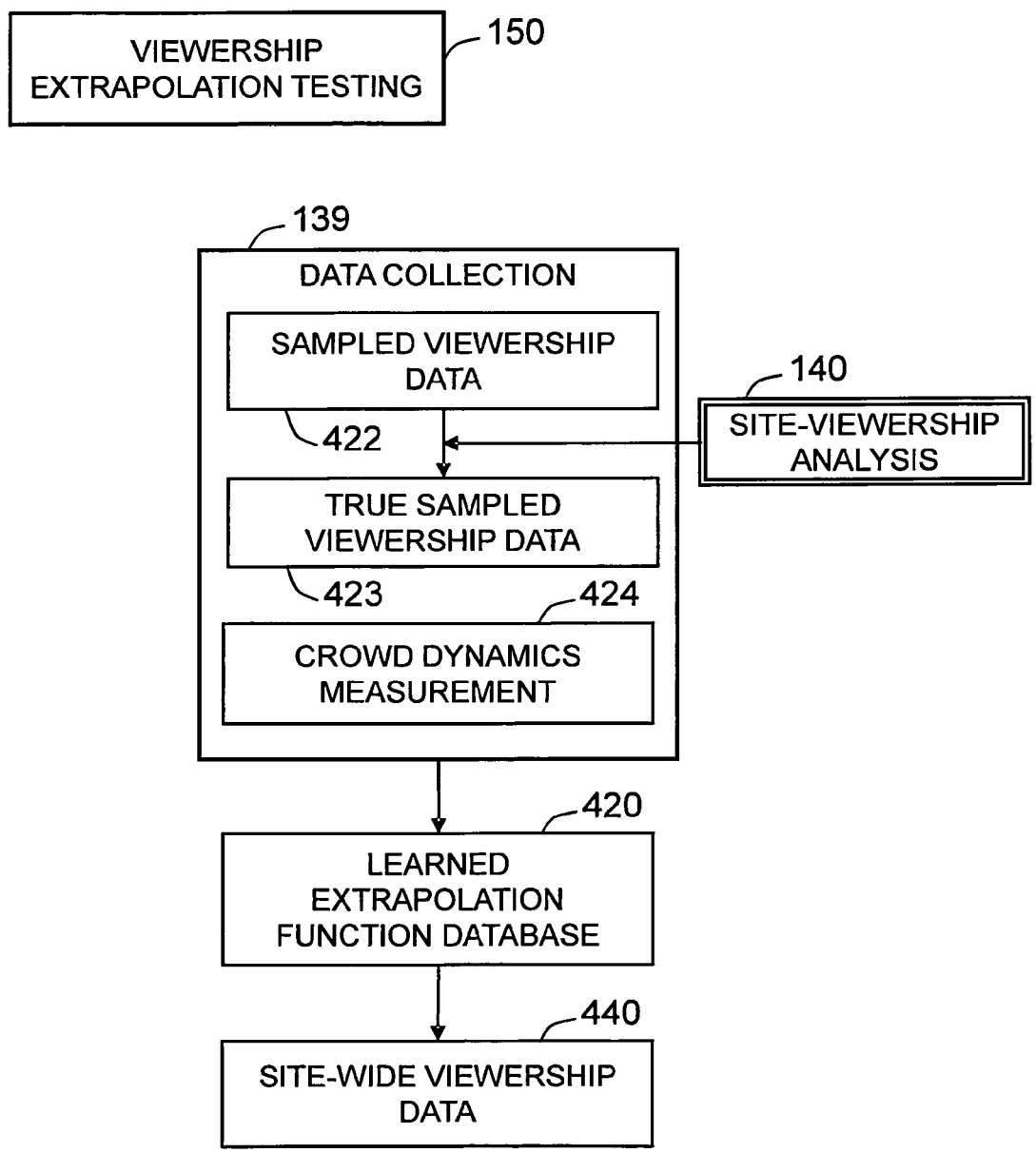
FIG. 12 shows the steps of how the viewership extrapolation is carried out in the viewership extrapolation testing stage.

FIG. 12 shows the steps of how the viewership extrapolation is carried out in the viewership extrapolation testing 150 stage. In the data collection 139 module, the sampled viewership data 422 is obtained by a sensor, and the true sampled viewership data 423 is estimated through the site-viewership analysis 140. The crowd dynamics measurements 424 are also obtained by the same or different sensor. Given these two measurement, the site-wide viewership data 440 is estimated by first finding a suitable extrapolation function among the learned extrapolation function database 420 and then injecting the input measurements to the extrapolation function. Let us revisit the exemplary embodiment discussed in FIG. 8, where the extrapolation function is modeled as the following:

$$s(t)=a_i r(q(t))+b_i, \text{ for } c_i(t), \qquad (4)$$

where i is the index of the crowd dynamics feature cluster, and $a_i$ and $b_i$ are parameters. If the parameters are learned for each cluster of the crowd dynamics features, then there is a unique pair of $a_i$ and $b_i$ associated with a unique cluster of the crowd dynamics feature. Thus, upon the reception of a newly acquired crowd dynamics measurement 424, the corresponding cluster can be found in the crowd dynamics feature space, and then the unique pair of $a_i$ and $b_i$ can also be found. Given the sampled viewership data 422, the true sampled viewership data 423 is estimated by using the viewership relevancy obtained from the site-viewership analysis. Then the site-wide viewership data 440 is also estimated by applying the viewership extrapolation. For another embodiment where only the tuples of (a,c(t)) are stored without clustering of the crowd dynamics features, k-nearest neighbor of the input crowd dynamics feature may be found in the feature space. Then k pairs of the tuples are used to produce k different estimates of the site-wide viewership data 440 from each pair of the parameters. Then an average or a median may be taken to estimate the final site-wide viewership data.

FIG. 13 shows an exemplary networked system of a plurality of means for control and processing and a plurality of sensors in the present invention that is used to build a comprehensive media audience system, where the networked system further consists of a plurality of first means for control and processing and a plurality of second means for control and processing, each of which takes a part of the vision processing of images captured by the sensors for the viewers of displays in a site.

The present invention is an apparatus for building a media audience measurement system based on a viewership extrapolation of measured media audience in a site while taking into account the crowd dynamics at a given time. The apparatus comprises means for capturing a plurality of input images of the people by at least a sensor, e.g., a first set of sensors 360 or a second set of sensors 361, in the vicinity of the measurement area, means for processing the plurality of input images, e.g., first means for control and processing 362 or second means for control and processing 363, in order to measure the viewership data and the crowd dynamics data in the measurement area. The apparatus also comprises means for aggregating the measurements the viewership data and the crowd dynamics data. The first means for control and processing 362 or second means for control and processing 363 may be used as the exemplary embodiment of these means for aggregating the measurements.

In the exemplary embodiment, a plurality of sensors, e.g., a plurality of first set of sensors 360, are connected to the means for video interface in a means for control and processing, e.g., a first means for control and processing 362.

The sensors are placed in a distributed architecture to facilitate the measurement of the viewership data. If the distance between the pluralities of sensors is greater than a means for control and processing can handle, the plurality of sensors can be connected to multiple means for video interface.

For example, in the exemplary embodiment shown in FIG. 13, a plurality of first set of sensors 360, such as a "sensor 1" 364 and a "sensor 2" 365, are connected to the means for video interface in a first means for control and processing 362. The plurality of means for control and processing can be connected in a local area network and communicate with each other.

In an exemplary deployment of the system that embodies the present invention, the first set of sensors 360 can be installed where the field-of-view can cover the traffic of the people in the measured location and the second set of sensors 361 can be installed in an area in which the frontal view of the people can be captured. The sensors are connected to the means for video interface through cables.

The digitized video data from the means for video interface is transferred to the means for control and processing that executes computer vision algorithms on the data. The means for control and processing can have internal means for storing data or external means for storing data.

The sensors can comprise an analog camera, USB camera, RGB camera, Depth camera, RGB-D camera, or Firewire camera. The means for video interface, which can comprise a video frame grabber, USB interface, or Firewire interface, are typically included in the same enclosure as the means for control and processing.

The means for control and processing can be a general purpose personal computer, such as an i5/i7/MAC/ARM-based PC, or a dedicated hardware, such as an FPGA-/DSP-based implementation of a device, which can carry out the required computation. The means for control and processing, as well as the means for video interface, can be placed locally or remotely, as long as the connection to the sensors can be established.

The internal means for storing data, such as the internal hard disk drives, SSD drives, and FLASH memories, is placed within the same enclosure as the means for control and processing. The external means for storing data, such as a network-attached storage or internal hard disk drives contained in a remote computer, can be placed locally or remotely, as long as a means for transferring data is available.

The number of sensors per a means for control and processing varies, depending on the system configuration in the physical space. However, each means for control and processing knows the identification of the associated plurality of sensors that are assigned to the selected locations in a store area and the area covered by sensors.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for building a media audience measurement system based on a viewership extrapolation of measured media audience in a site, comprising the following steps of:

a) estimating, by a computer, viewership relevancy distribution and viewer occupancy distribution,
b) estimating, by the computer, viewership distribution from both the viewership relevancy distribution and the viewer occupancy distribution,
c) placing a plurality of sensors in optimal positions to measure viewership data in the site with given constraints that include budget and hardware specifications of available sensors,
d) modeling features for capturing viewership and crowd dynamics,
e) modeling functions for extrapolation-function learning,
f) measuring, by the computer, a first set of sampled viewership data, a first set of site-wide viewership data, and a first set of crowd dynamics data,
g) capturing a plurality of images using a plurality of sensors deployed in the site,
h) dividing each image into multiple regions in a grid,
i) extracting optical flows of each image from each region in the grid,
j) constructing a histogram of the optical flows according to their orientations for each region in the grid,
k) concatenating histograms of multiple regions, whereby the crowd dynamics data of an image can be represented by a single feature vector,
l) estimating, by the computer, a first set of true sampled viewership data from the first set of sampled viewership data,
m) learning viewership extrapolation functions based on relationship between the first set of sampled viewership data and the first set of site-wide viewership data while taking into account the first set of crowd dynamics data, and
n) extrapolating, by the computer, a second set of site-wide viewership data using a second set of sampled viewership data and a second set of crowd dynamics data when the media audience measurement system is deployed in the site, wherein the viewership distribution is defined as probability distribution that a viewer is located at a certain position in a site and a viewer is engaged with a display.

2. The method according to claim 1, wherein the method further comprises a step of estimating the viewership relevancy distribution, further comprising the following steps of:
a) modeling a visibility distribution based on geographic and geometric attributes of each display in the site,
b) estimating visibility distributions of displays in the site, and
c) estimating the viewership relevancy distribution based on the visibility distributions, taking into account a viewership measurement algorithm,
wherein the visibility distribution is a probability distribution that a viewer is engaged with a display, given a viewer at a position.

3. The method according to claim 1, wherein the method further comprises a step of estimating the viewer occupancy distribution based on a collection of images of viewers in the site, which is taken by using a plurality of sensors with an occupancy measurement algorithm,
wherein the viewer occupancy distribution indicates how likely a viewer for any display is located at a position in the site, and
wherein crowd becomes the viewers at a given time when the crowd is located in the site and engaged with displays.

4. The method according to claim 1, wherein the method further comprises a step of estimating the first set of true sampled viewership data from the first set of sampled viewership data using the viewership relevancy distribution of a first target display by a viewership noise removal process,
wherein the first set of sampled viewership data is modeled as a subset of the true viewers of the first target display with a noise.

5. The method according to claim 1, wherein the method further comprises a step of measuring the first set of sampled viewership data, further comprising a series of the following computer vision steps:
a) capturing a plurality of images in the site,
b) extracting features of viewers in the images captured from a plurality of sensors,
c) detecting faces of the viewers,
d) tracking the faces of the viewers,
e) estimating 3D pose of the faces of the viewers, and
f) collecting the first set of sampled viewership data.

6. The method according to claim 1, wherein the method further comprises a step of estimating the second set of site-wide viewership data based on the viewership extrapolation, further comprising the following steps:
a) measuring the second set of sampled viewership data and the second set of crowd dynamics data,
b) estimating a second set of true sampled viewership data from the second set of sampled viewership data using the viewership relevancy distribution at the site,
c) finding a viewership extrapolation function in a database of the viewership extrapolation functions, and
d) extrapolating the second set of site-wide viewership data.

7. The method according to claim 6, wherein the method further comprises a step of estimating the second set of true sampled viewership data from the second set of sampled viewership data using the viewership relevancy distribution of a second target display by a viewership noise removal process,
wherein the second set of sampled viewership data is modeled as a subset of the true viewers of the second target display with a noise.

8. The method according to claim 6, wherein the method further comprises a step of measuring the second set of sampled viewership data, further comprising a series of the following computer vision steps:
a) capturing a plurality of images in the site,
b) extracting features of viewers in the images captured from a plurality of sensors,
c) detecting faces of the viewers,
d) tracking the faces of the viewers,
e) estimating 3D pose of the faces of the viewers, and
f) collecting the second set of sampled viewership data.

9. A media audience measurement system based on a viewership extrapolation of measured media audience in a site, comprising:
a computer that performs the following steps of:
a) estimating, by the computer, viewership relevancy distribution and viewer occupancy distribution,
b) estimating, by the computer, viewership distribution from both the viewership relevancy distribution and the viewer occupancy distribution, and
c) placing a plurality of sensors in optimal positions to measure viewership data in the site with given constraints that include budget and hardware specifications of available sensors,
d) modeling features for capturing viewership and crowd dynamics, e) modeling functions for extrapolation-function learning,
f) sensors for measuring a first set of sampled viewership data, a first set of site-wide viewership data, and a first set of crowd dynamics data,
g) a plurality of sensors for capturing a plurality of images in the site, and
h) dividing each image into multiple regions in a grid,
i) extracting optical flows of each image from each region in the grid,
j) constructing a histogram of the optical flows according to their orientations for each region in the grid,
k) concatenating histograms of multiple regions, whereby the crowd dynamics data of an image can be represented by a single feature vector,
l) first learning machine for estimating a first set of true sampled viewership data from the first set of sampled viewership data,
m) a second learning machine for learning viewership extrapolation functions based on relationship between the first set of sampled viewership data and the first set of site-wide viewership data while taking into account the first set of crowd dynamics data, and
n) extrapolating, by the computer, a second set of site-wide viewership data using a second set of sampled viewership data and a second set of crowd dynamics data when the media audience measurement system is deployed in the site.

10. The apparatus according to claim 9, wherein the apparatus further comprises a computer for estimating the viewership relevancy distribution, performing the following steps of:
a) modeling a visibility distribution based on geographic and geometric attributes of each display in the site,
b) estimating visibility distributions of displays in the site, and
c) estimating the viewership relevancy distribution based on the visibility distributions, taking into account a viewership measurement algorithm,
wherein the visibility distribution is a probability distribution that a viewer is engaged with a display, given a viewer at a position.

11. The apparatus according to claim 9, wherein the apparatus further comprises a computer for estimating the viewer occupancy distribution based on a collection of images of viewers in the site, which is taken by using a plurality of sensors with an occupancy measurement algorithm.

12. The apparatus according to claim 9, wherein the apparatus further comprises a computer for estimating the first set of true sampled viewership data from the first set of sampled viewership data using the viewership relevancy distribution of a first target display by a viewership noise removal process.

13. The apparatus according to claim 9, wherein the apparatus further comprises:
a) a plurality of sensors for capturing a plurality of images in the site, and
b) a computer that performs the following computer vision steps of:
extracting features of viewers in images captured from a plurality of sensors,
detecting faces of the viewers,
tracking the faces of the viewers,
estimating 3D pose of the faces of the viewers, and
collecting the first set of sampled viewership data.

14. The apparatus according to claim 9, wherein the apparatus further comprises a computer for estimating the second set of site-wide viewership data based on the viewership extrapolation, further comprising:
a) sensors for measuring the second set of sampled viewership data and the second set of crowd dynamics data, and
b) a computer that performs the following steps of:
estimating a second set of true sampled viewership data from the second set of sampled viewership data using the viewership relevancy distribution at the site,
finding a viewership extrapolation function in a database of the viewership extrapolation functions, and
extrapolating the second set of site-wide viewership data.

15. The apparatus according to claim 14, wherein the apparatus further comprises a computer for estimating the second set of true sampled viewership data from the second set of sampled viewership data using the viewership relevancy distribution of a second target display by a viewership noise removal process.

16. The apparatus according to claim 14, wherein the apparatus further comprises
a) a plurality of sensors for capturing a plurality of images in the site, and
b) a computer that performs the following computer vision steps of:
extracting features of viewers in the images captured from a plurality of sensors,
detecting faces of the viewers,
tracking the faces of the viewers,
estimating 3D pose of the faces of the viewers, and
collecting the second set of sampled viewership data.

* * * * *